(12) United States Patent
Ginesi et al.

(10) Patent No.: US 6,456,654 B1
(45) Date of Patent: Sep. 24, 2002

(54) FRAME ALIGNMENT AND TIME DOMAIN EQUALIZATION FOR COMMUNICATIONS SYSTEMS USING MULTICARRIER MODULATION

(75) Inventors: Alberto Ginesi, Ottawa; Christian Bourget, Hull; Mohammad Pakravan, Ottawa, all of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/218,054

(22) Filed: Dec. 22, 1998

(51) Int. Cl.[7] .................................................. H03H 7/30
(52) U.S. Cl. ...................... 375/229; 375/230; 375/231; 375/260; 375/347
(58) Field of Search .............................. 375/229, 230, 375/231, 233, 260, 261, 346, 347, 348; 333/18, 28; 708/300, 322

(56) References Cited

U.S. PATENT DOCUMENTS

| | | | |
|---|---|---|---|
| 5,285,474 A | | 2/1994 | Chow et al. ................... 375/13 |
| 6,097,763 A | * | 8/2000 | Djokovic et al. ........... 375/260 |
| 6,128,349 A | * | 10/2000 | Chow .......................... 375/260 |
| 6,185,251 B1 | * | 2/2001 | Fertner ........................ 375/231 |

OTHER PUBLICATIONS

"A Low–Complexity Pole–Zero MMSE Equalizer for ML Receivers", N. Al–Dhahir and J. Cioffi, Proc. of 32nd Annual Allerton Conference on Communication, Control and Computing, Sep. 28–30, 1994, pp. 623–632.

"Equalizer Training Algorithms for Multicarriers Modulation Systems", J.S. Chow et al., International Conference on Communications, May 1993, Geneva, pp. 761–765.

"A Discrete Multitone Transceiver System for HDSL Applications", J.S. Chow et al., IEEE Journal on Selected Areas in Communications, vol. 9, No. 6, Aug. 1991, pp. 895–908.

"Fast Start–Up Equalization with Periodic Training Sequences", S.H. Qureshi, IEEE Transactions on Information Theory, vol. IT–23, No. 5, Sep. 1977, pp. 533–563.

\* cited by examiner

*Primary Examiner*—Stephen Chin
*Assistant Examiner*—Shuwang Liu

(57) ABSTRACT

A discrete multitone (DMT) receiver has a time domain equalizer (TDEQ) which is trained during initialization using an estimated channel impulse response (CIR). To eliminate wrap-around of the estimated CIR relative to the DMT frame alignment, and to remove leading zeroes, the estimated CIR is circularly advanced relative to the frame alignment for training the TDEQ. In subsequent communications of DMT symbols via the channel and the TDEQ, the equalized samples of the received DMT symbols are buffered to compensate, in a frame alignment of the received DMT symbols, for the advance of the estimated CIR in the initialization process and for a delay in the TDEQ.

16 Claims, 3 Drawing Sheets

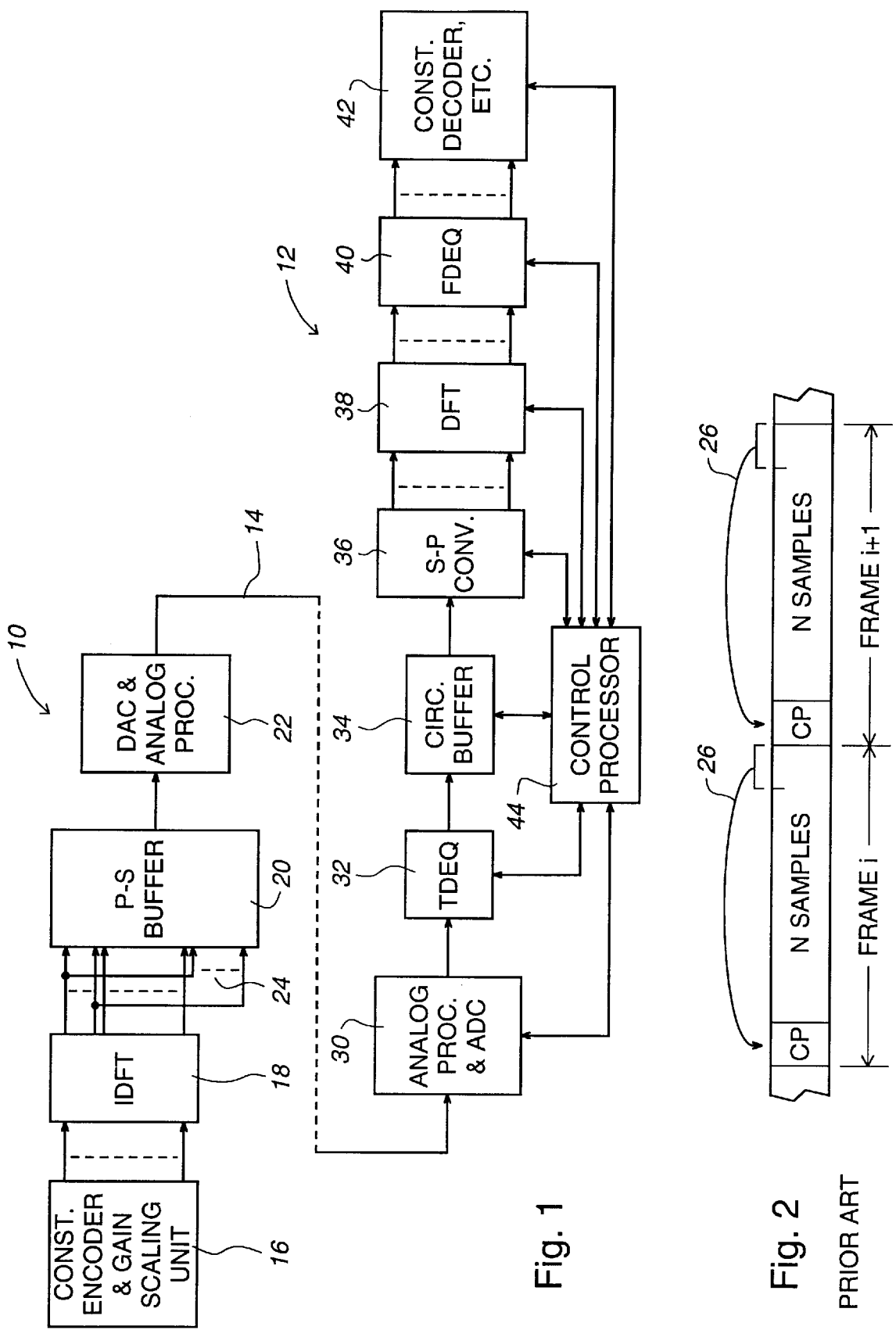

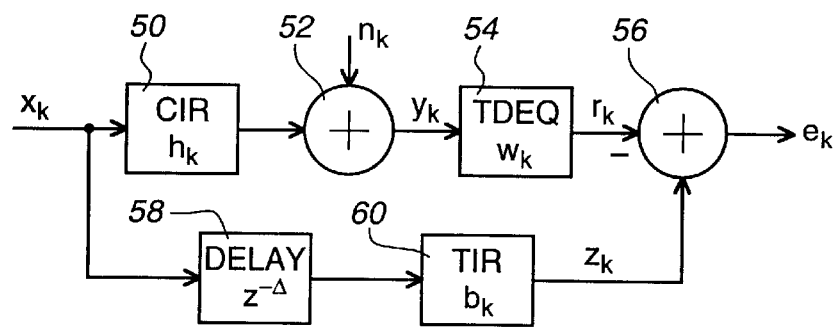
Fig. 3
PRIOR ART
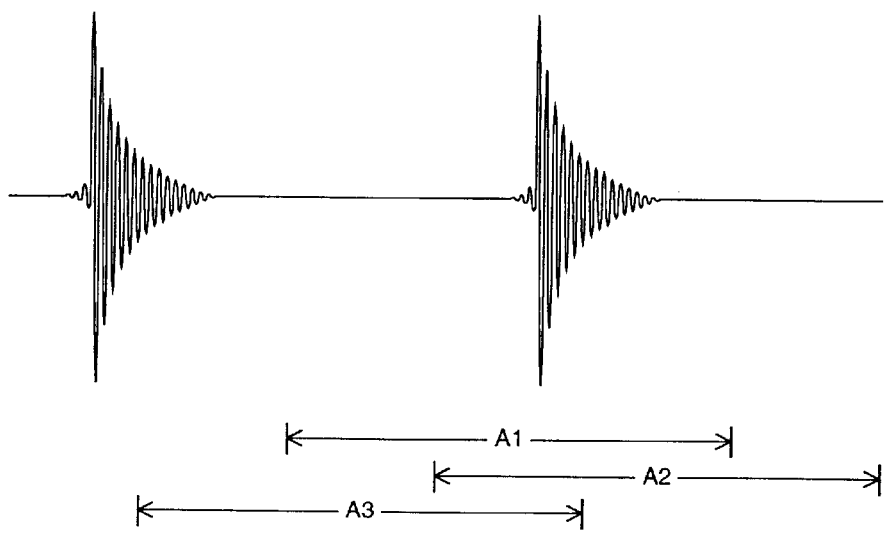
Fig. 4
PRIOR ART
Fig. 5

FRAME ALIGNMENT AND TIME DOMAIN EQUALIZATION FOR COMMUNICATIONS SYSTEMS USING MULTICARRIER MODULATION

This invention relates to a method of operating a receiver of a system which communicates multicarrier modulation (MCM) symbols via a communications channel, and to such a receiver. In particular, the invention is concerned with aspects of the receiver and its operation which relate to time domain equalization and frame alignment (also referred to as frame synchronization). Most commonly, MCM is implemented by discrete multitone (DMT) modulation, and this is assumed to be the case in the description below, but the invention can also be applied to other implementations of MCM.

BACKGROUND OF THE INVENTION

Communications systems using DMT modulation, referred to below as DMT systems, are becoming of increasing importance, especially for ADSL (Asymmetrical Digital Subscriber Line) communications on telephone subscriber lines. For example, American National Standards Institute (ANSI) draft standard T1.413-1998, entitled "T1.413 Issue 2" and also known as "Network and Customer Installation Interfaces—Asymmetrical Digital Subscriber Line (ADSL) Metallic Interface", referred to below for convenience simply as T1.413, provides detailed information on DMT systems.

In such a DMT system, ADSL data frames, for example at a frame rate of 4 kHz, are encoded and modulated each into a respective DMT symbol using an inverse discrete Fourier transform (IDFT), the DMT symbols being communicated in a superframe structure comprising 68 ADSL data frames or DMT symbols and a DMT synchronization symbol. As there is one DMT symbol for each ADSL data frame, the terms "frame" and "DMT symbol" are to some extent synonymous.

It is well known that inter-symbol interference (ISI) and inter-carrier interference (ICI) can seriously degrade performance of a DMT system. Accordingly, it is known to provide a time domain equalizer (TDEQ) at the receiving end of the communications path or channel in order to shorten the channel impulse response (CIR) to be less than or equal to the length of a cyclic prefix which is added to the communicated information. For example for a block of N=512 samples supplied from the IDFT to a subsequent digital-to-analog converter (DAC) for supplying a resulting analog signal to the communications channel, the last 32 of these samples can be additionally added in sequence before the start of the block as a cyclic prefix. If the CIR is reduced by the TDEQ to be no greater than the duration of the cyclic prefix, then ISI from the preceding symbol is avoided by discarding the cyclic prefix at the receiver, and the effect of the cyclic prefix on the subsequent samples of the block is easily accommodated. A frequency domain equalizer (FDEQ) is also provided at the receiving end, after the IDFT, in order to complete the equalization of the channel.

In an initialization process for subsequent communication of information using a DMT system, it is necessary among other things to determine coefficients for the taps of the TDEQ, referred to as training the TDEQ. It is known to do this using a minimum mean square error (MMSE) method, for example as is known from Al-Dhahir and J. Cioffi, "A Low-Complexity Pole-Zero MMSE Equalizer for ML Receivers", Proceedings of the 32nd Annual Allerton Conference on Communication, Control, and Computing", Sep. 28–30, 1994, pages 623–632. In this method, the TDEQ is trained in order to produce an overall impulse response, due to the channel and the TDEQ, that matches, in a MMSE sense, a model consisting of a cascade of a pure delay $\Delta$ and an ideal target impulse response (TIR) of length p+1 samples, where p is the length in samples of the cyclic prefix and $\Delta$ is the overall delay due to the channel and TDEQ. This method is dependent upon an appropriate CIR estimate and value of $\Delta$.

It is known to estimate the CIR during the initialization process by transmitting a probing signal with a period equal to the DMT symbol period; due to this periodicity neither a cyclic prefix nor the TDEQ at the receiver is required or used. A comb of tones with the same frequency spacing as the DMT tones is transmitted to enable the receiver to determine amplitudes and phases associated with all of the DMT tones, i.e. the channel frequency response for the DMT tones, and to derive the estimated CIR by performing an IDFT of the channel frequency response.

However, the channel frequency response and CIR as estimated in this manner are affected by the frame alignment between the transmitter and receiver during this channel estimation process. As the frame alignment affects the channel delay that is seen by the receiver, estimated CIRs are produced with different time shifts and, due to the periodic nature of the probing signal, as described below these can result in the estimated CIR being wrapped-around relative to the frame alignment. If a wrapped-around estimated CIR is used for TDEQ training, then the performance of the TDEQ may be significantly degraded.

As the TDEQ training is carried out in real time during the initialization process, it is also desirable to reduce the computational complexity of this training. To this end it may be desirable to reduce the number of equalizer taps used in the TDEQ, but in this case the degradation of the TDEQ performance discussed above is increased.

After training, the TDEQ is introduced into the communications channel where it presents an additional delay which affects the frame alignment. As the receiver must use the correct frame alignment in order to detect the MCM symbols communicated in normal operation of the system, the correct frame alignment must be recovered on introduction of the TDEQ. It is desirable t6 avoid a lengthy search by the receiver for the correct frame alignment after training of the TDEQ.

An object of this invention, therefore, is to provide an improved method of operating a receiver of a communications system using MCM, such as a DMT system, and an improved receiver for such a system.

SUMMARY OF THE INVENTION

One aspect of this invention provides a method of operating a receiver of a system which communicates multicarrier modulation (MCM) symbols via a communications channel, comprising the steps of: in an initialization process: estimating a channel impulse response (CIR) of the channel using a predetermined periodic signal received via the channel; circularly advancing the estimated CIR relative to a frame alignment of the MCM symbols to eliminate wrap-around of the estimated CIR relative to the frame alignment; and determining parameters for time domain equalization, of MCM symbols received via the channel, using the advanced estimated CIR; and, in subsequent communications of MCM symbols via the channel: equalizing received MCM symbols in accordance with the determined time domain equalization parameters; and retarding frame alignment for the equalized received MCM symbols to compensate for the advance of the estimated CIR in the initialization process.

The circular advancement of the estimated CIR to eliminate of wrap-around relative to the frame alignment avoids determination of inappropriate parameters for the time domain equalization, and the retarding of the frame alignment for equalized received symbols avoids a need for searching for a new frame alignment.

Preferably the step of circularly advancing the estimated CIR relative to a frame alignment of the MCM symbols comprises circularly advancing the estimated CIR to remove leading substantially zero parts of the estimated CIR. This reduces the computational complexity required for the time domain equalization.

In a preferred embodiment of the invention, the step of circularly advancing the estimated CIR relative to a frame alignment of the MCM symbols comprises determining a first position relative to the frame alignment of a maximum energy part of the estimated CIR, determining a second position in advance of the first position at which an energy of the estimated CIR is below a threshold, and circularly advancing the estimated CIR by an amount D to move the second position to a frame alignment boundary. The step of retarding the frame alignment for the equalized received MCM symbols preferably retards the frame alignment by an amount D+$\Delta$, where $\Delta$ is a time domain equalization delay. The time domain equalization can be performed by a time domain equalizer having an integer number of M taps for samples of the received MCM symbols, with $\Delta$ being approximately equal to M/2.

The method preferably includes the step of storing time domain equalized samples of the received MCM symbols in a circular buffer having a capacity for samples of at least two MCM symbols, the step of retarding the frame alignment for the equalized received MCM symbols comprising adjusting a read pointer for reading samples from the circular buffer.

In preferred embodiments of the invention the MCM symbols comprise discrete multitone (DMT) symbols.

Another aspect of the invention provides a receiver for an MCM or DMT communications system, arranged for operation in accordance with the above method.

The receiver can include a control processor for determining the parameters for time domain equalization, a time domain equalizer for processing samples of received DMT symbols in accordance with the determined parameters, and a circular buffer for buffering samples output from the time domain equalizer to provide the retarding of the frame alignment.

Another aspect of the invention provides a method of operating a receiver of a discrete multitone (DMT) communications system, the receiver including a time domain equalizer for processing samples of DMT symbols communicated via a communications channel, comprising the steps of: in an initialization process: estimating a channel impulse response (CIR) of the channel using a predetermined periodic signal received via the channel; circularly advancing the estimated CIR relative to a frame alignment of the DMT symbols to eliminate wrap-around of the estimated CIR relative to the frame alignment and to remove leading substantially zero parts of the estimated CIR; and determining parameters for the time domain equalizer from the advanced estimated CIR; and, in subsequent communications of DMT symbols via the channel: processing samples of received DMT symbols in the time domain equalizer in accordance with the determined parameters; and buffering the equalized samples of the received DMT symbols to compensate, in a frame alignment of the received DMT symbols, for the advance of the estimated CIR in the initialization process. The buffering of the equalized samples of the received DMT symbols preferably also compensates for a delay of the time domain equalizer.

BRIEF DESCRIPTION OF THE DRAWINGS

The invention will be further understood from the following description with reference to the accompanying drawings, in which:

FIG. 1 schematically illustrates a block diagram of parts of a DMT system transmitter and parts of a DMT system receiver in accordance with an embodiment of the invention;

FIG. 2 is a diagram illustrating the known form of frames of the DMT system of FIG. 1;

FIG. 3 is a diagram illustrating a known manner in which MMSE is applied for training a TDEQ of the DMT system receiver of FIG. 1;

FIG. 4 is a diagram illustrating matrix extraction in known manner in the TDEQ training process;

FIG. 5 illustrates a periodic waveform with three different frame alignments;

DETAILED DESCRIPTION

Figure 6:
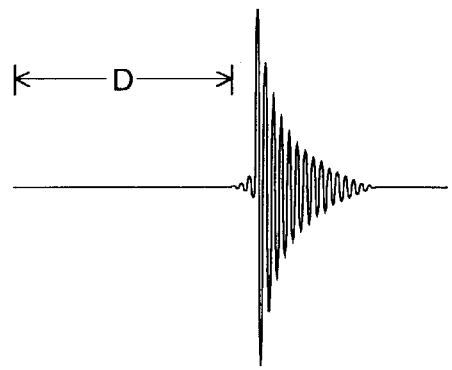
FIGS. 6, 7, and 8 illustrate IDFT output waveforms representing an estimated CIR for the three different frame alignments of FIG. 5.

Referring to the drawings, FIG. 1 illustrates a block diagram of parts of a DMT system transmitter 10 and parts of a DMT system receiver 12 which are relevant to a full understanding of this invention. Although FIG. 1 illustrates the transmitter 10 and receiver 12 for only one direction of transmission via a communications path or channel 14, it will be appreciated that typically another transmitter and receiver (not shown) may typically be provided for communications in the opposite direction on the same communications path, which may for example comprise a two-wire telephone line for ADSL communications, and typically similar processes to those described below can take place for the communications in this opposite direction of transmission.

The transmitter operates in known manner, for example as described in T1.413. To this end, data frames in the frequency domain are supplied in known manner from a constellation encoder and gain scaling unit 16 to inputs of an IDFT 18, the time domain output signals of which are buffered and converted from parallel (P) to serial (S) form in a P-S buffer 20 and supplied to the channel 14 via a DAC and analog signal processing unit 22. As is known in the art and not shown in FIG. 1, the unit 16 is supplied with data frames following digital signal processing which may involve steps such as scrambling, forward error correction, interleaving, and tone ordering.

As illustrated in FIG. 1 by connections 24, the buffer 20 is supplied from the IDFT 18 with a duplicate block of time domain samples from the end of each frame or DMT symbol, for addition in sequence at the start of the frame as a cyclic prefix. FIG. 2 shows the resulting frame format for two consecutive frames i and i+1. Each frame comprises N samples preceded by a cyclic prefix (CP) which is constituted by a block of samples from the end of the same frame, as indicated in FIG. 2 by arrows 26. By way of example, with N=512 samples the cyclic prefix may conveniently be constituted by the last 32 samples of the frame, and with N=64 samples the cyclic prefix may conveniently be constituted by the last 4 samples of the frame.

The general form of the receiver 12 as shown in FIG. 1 is also known except for the provision of a circular buffer 34 and the operation as described below. Signals received from the channel 14 are supplied to an analog signal processing and analog-digital converter (ADC) unit 30 to produce digital signal samples which are supplied to a TDEQ 32. Output samples from the TDEQ 32 are supplied via the circular buffer 34, the cyclic prefix in each frame being dropped, and via a series-parallel converter 36 to provide time domain samples to a discrete Fourier transform (DFT) 38. Frequency domain signals from outputs of the DFT are supplied via an FDEQ 40 to a constellation decoder 42, digital signals at the outputs (not shown) of which are processed and recovered in known manner. A control processor unit 44 receives signals from and supplies signals to the units 32 to 42 for controlling operation of the receiver. The control processes include timing recovery, frame alignment by control of the circular buffer 34 as described below, and determination of parameters for operation of all of the various blocks of the receiver 12 as described below and otherwise as known in the art.

As discussed above, the TDEQ 32 serves effectively to shorten the CIR of the channel 14 to p+1 samples where p is the length of the cyclic prefix, so that ISI is eliminated by discarding the cyclic prefix at the receiver. During the initialization process for communications via the channel 14, the TDEQ is trained, i.e. its tap coefficients are determined, accordingly. The FDEQ 40 completes the equalization required for the channel 14. The TDEQ 32 is trained using a MMSE method which is described below with reference to FIG. 3, which is a known block diagram used to describe the operation of the TDEQ, and FIG. 4, which illustrates matrix extraction used in the TDEQ training.

Referring to FIG. 3, a function 50 represents the CIR of the channel 14 with weights $h_k$ where k is an integer from 0 to v, the length of the CIR being v+1. The samples of the DMT signal supplied to the channel 14 are represented by an input $x_k$, and $n_k$ represents noise and interference which is added by an adder 52 to produce samples $y_k$ which are received by the receiver 12. The function of the TDEQ 32, to which the samples $y_k$ are supplied, is represented by a function 54 with $w_k$ representing the TDEQ tap weights with k being an integer from 0 to M−1, the TDEQ having M taps. A lower branch of the diagram in FIG. 3 illustrates the channel model that the TDEQ 32 is intended to match the communication channel 14 with, this comprising a delay function 58 to which the samples $x_k$ are supplied, Δ being the overall delay via the channel 14 and TDEQ 32, followed by the target impulse response (TIR) 60 having p+1 taps with weights $b_k$ with k being an integer from 0 to p. In an adder 56, the output $r_k$ of the TDEQ function 54 is subtracted from the output $z_k$ of the TIR function 60 to produce an error $e_k$. The quality of the match is determined in terms of the power of the error $e_k$, i.e. the mean square error (MSE). The MMSE method seeks to determine a delay Δ and weights $b_k$ and $w_k$ which minimize the MSE.

A description of the MMSE method is provided by the publication by Al-Dhahir and Cioffi referred to above. The steps of the method are summarized below.

Initially, a matrix H having M rows and M+v columns is formed as shown in FIG. 4. The M×M Toeplitz matrix $R=HH^H+(1/P_x)R_{nn}$ is then formed, and its inverse $R^{-1}$ is calculated. As R is a Toeplitz symmetric matrix, it can be inverted efficiently to calculate the inverse matrix $R^{-1}$ using Levinson's method. Alternatively, a Cholesky decomposition can be used; both of these methods are known in the art. For each value of Δ, a matrix $H_\Delta$ having M rows and p+1 columns is extracted from the matrix H in the manner indicated in FIG. 4, and a matrix $R_\Delta$ is calculated in accordance with:

$$R\Delta = P_x(I_{p+1} - H_\Delta^H R^{-1} H\Delta)$$

One of two alternative constraints, referred to as the unit tap constraint (UTC) and the unit energy constraint (UEC), is then applied. With the UTC, an index parameter i ($0 \leq i \leq p$) is defined that sets the i-th tap of the TIR to unity, and the coefficients $b_k$ of the TIR function 60 are determined for different values of i in accordance with:

$$b = R_\Delta^{-1} e_i / R_\Delta(i,i)$$

With the UEC, b is calculated as the eigenvector corresponding to the minimum eigen-value of RΔ. With either constraint, the coefficients $w_k$ of the TDEQ function 54 are calculated in accordance with:

$$w = b^H H_\Delta^H R^{-1}$$

Thus the TDEQ tap coefficients $w_k$ and the TIR tap coefficients $b_k$ are determined by matrix manipulations in known manner. However, it can be appreciated from the above description that the determinations of these tap coefficients is dependent upon the estimated CIR (i.e. the matrix H) and the selection of an optimum value for Δ.

As described above in the background of the invention, it is known during the initialization process of a DMT system to transmit a periodic probing signal without a cyclic prefix and, at the receiver without using the TDEQ, to estimate the channel frequency response and to derive the CIR from this by performing an IDFT. FIG. 5 shows a periodic waveform corresponding to a resulting output of the IDFT, and shows by way of example three different frame alignments A1, A2, and A3 which can exist between the transmitter and the receiver. It can be appreciated that the actual frame alignment is unknown and can have any arbitrary position relative to the waveform shown in FIG. 5, not just one of the three particular frame alignments illustrated.

Figure 7:
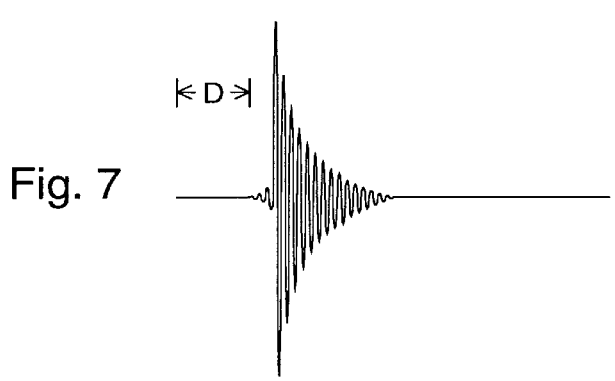
Figure 8:
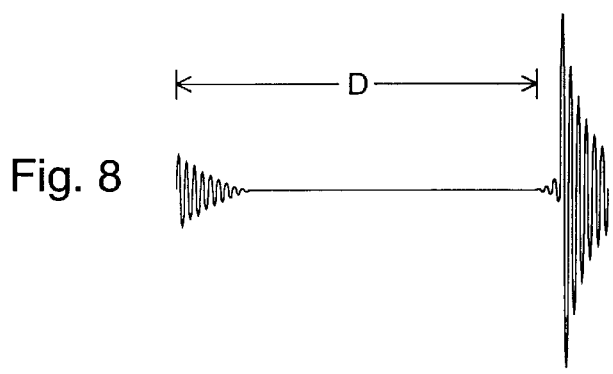

FIGS. 6, 7, and 8 illustrate the output of the IDFT, i.e. the directly estimated CIR, from the waveform in FIG. 5 for the three alignments A1, A2, and A3 respectively. As shown in FIGS. 6 and 7, the estimated CIRs have a similar form but have different time shifts from the frame alignment boundaries. As such estimated CIRs begin with different durations of substantially zero response before the occurrence of significant parts of the estimated CIR, using them to determine the tap coefficients of the TDEQ as described above results in unproductive computations.

As shown in FIG. 8, the estimated CIR is wrapped-around as a result of the frame alignment boundaries occurring during non-zero parts of the waveform of FIG. 5. Using such a wrapped-around estimated CIR to determine the tap coefficients as described above can significantly degrade the performance of the TDEQ.

Figure 9:
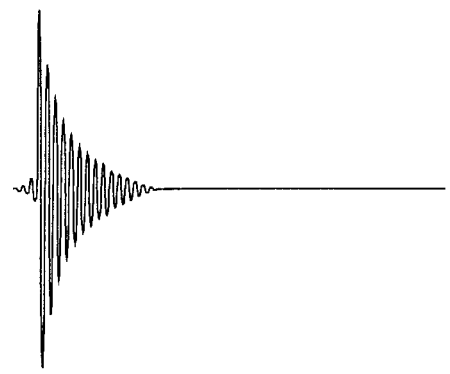
FIG. 9 illustrates a modified estimated CIR waveform produced in accordance with an embodiment of this invention from the waveform of FIGS. 6, 7, or 8.

In order to avoid these disadvantages, in accordance with this embodiment of the invention the estimated CIR is circularly shifted or advanced, thereby eliminating any wrap-around as shown in FIG. 8, so that it has a desired form as shown in FIG. 9, in which there is no wrap-around and leading substantially zero response parts of the estimated CIR are eliminated. This is performed in this embodiment of the invention by a process that is illustrated by the flow chart in FIG. 10 as described below.

Figure 10:
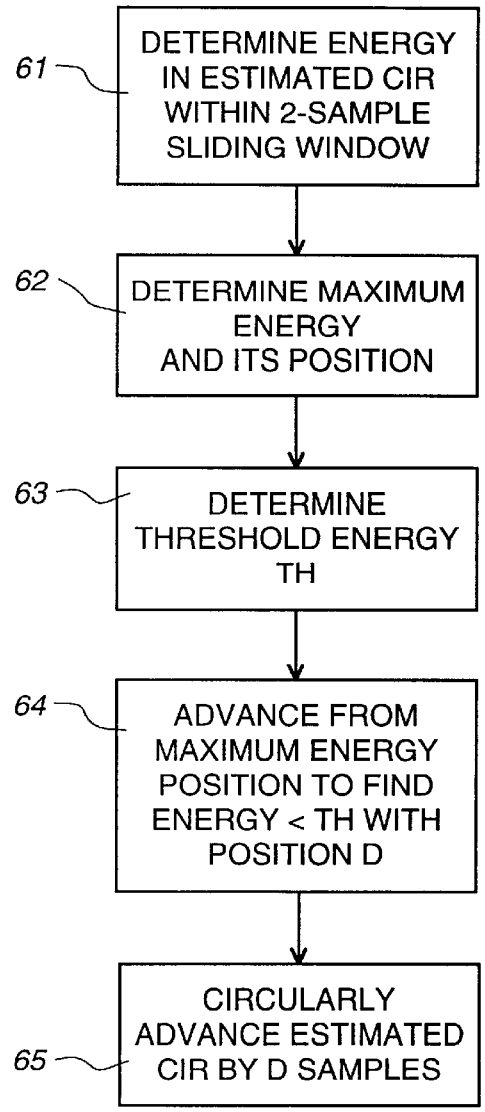
FIG. 10 is a flow chart of steps for producing the modified estimated CIR waveform of FIG. 9.

Referring to FIG. 10, initially as shown by a block 61 the energy of the estimated CIR is determined for each sample throughout the duration of the frame represented in FIG. 6, 7, or 8. In order to avoid errors due to ringing of the CIR, each determination of the energy is based on the energy of the samples over a window of, for example, 2 samples. Weighted averaging and similar techniques known with sliding window processes, and other window sizes, can be used if desired. As shown by a block 62, the maximum sample energy, and its position, is then determined. As can be seen from FIGS. 6 to 8, the maximum energy, generally corresponding to maximum amplitudes of the estimated CIR as illustrated, occurs at an arbitrary position within the frame, greater than D samples from the start of the prevailing frame alignment.

As shown by a block 63, a threshold energy TH is determined, conveniently as a predetermined fraction of the maximum energy determined at block 62. For example, the threshold energy TH can be of the order of $10^{-5}$ times the maximum energy.

As shown by a block 64, starting from the position of the maximum energy determined at block 62 and advancing (moving left in FIGS. 6 to 8), the first sample is determined for which the determined energy is less than the threshold energy TH; this sample has the position denoted by D in FIGS. 6 to 8. This step can be optimized by instead starting at a predetermined number of samples in advance of the position of the maximum energy. In any event, this determines the value of D as shown in FIGS. 6 to 8.

As shown by a block 65, the estimated CIR is then circularly advanced or shifted left by D samples, thereby unwrapping it if necessary from the form shown in FIG. 8, to produce the resulting estimated CIR shown in FIG. 9. It can be appreciated that, because the estimated CIR is constituted by numbers stored for example in the control processor 44 to constitute the IDFT outputs producing the estimated CIR from the determined channel frequency response, the circular advance of the estimated CIR by D samples is easily provided in the control processor 44 by a circular rearrangement of these stored numbers, for example by a change in a pointer to the corresponding storage locations.

This circular advancing of the estimated CIR by D samples causes the estimated CIR to be inconsistent with the prevailing frame alignment or synchronization. In order to accommodate this inconsistency, as described later below the receiver 12 retards its frame alignment by D samples using the circular buffer 34 (FIG. 2), for which purpose the circular buffer stores samples for at least 2 DMT symbols or frame periods.

The estimated CIR, processed as described above with reference to FIG. 10 and as illustrated in FIG. 9, is used in the TDEQ training (determination of tap coefficients) as described above with reference to FIGS. 3 and 4. As indicated above, this also requires selection of a value of $\Delta$ to be used in the TDEQ training process. Although it has been suggested in the prior art to calculate the MSE for a set of values of $\Delta$ and to select a value of $\Delta$ that gives the least MSE, this imposes a considerable computation burden which must be performed within a limited time during the initialization process, and does not necessarily result in optimal performance in terms of channel transmission capacity.

Instead, in this embodiment of the invention, the integer part of M/2, the TDEQ having M taps, is selected as a value of $\Delta$, thereby effectively setting the overall channel delay equal to half the impulse response time span of the TDEQ 32.

The receiver 12 also compensates for the delay $\Delta$ by retarding its frame alignment or synchronization by a relative amount of $\Delta$ samples. This ensures that, for transmission of DMT symbols with a cyclic prefix and use of the TDEQ 32 in normal operation of the DMT system, the cyclic prefix is correctly removed before the DFT 38 in the receiver 12. As the delay by $\Delta$ samples also changes the effective channel delay by this same amount, a corresponding phase rotation is applied by the control processor 44 to the FDEQ 40.

From the above description, it can be seen that the frame alignment of the receiver 12 used for normal operation with the cyclic prefix and operation of the TDEQ 32 must be changed, relative to that used as described above for estimating the CIR, by being retarded by a total of D+$\Delta$ samples, of which D samples compensate for the relative shifting for the estimated CIR and $\Delta$ samples compensate for the delay introduced by the TDEQ 32 which is not used for the CIR estimation. To this end, the output samples from the TDEQ 32 in the receiver 12 of FIG. 2 are stored in the circular buffer 34, which has a capacity for samples of at least two DMT symbols or frames. The adjustment of the frame alignment is performed by retarding a read pointer, used for reading samples from the circular buffer 34 to the S-P converter 36, by the same amount of D+$\Delta$ samples, relative to a write pointer used for storing samples in the circular buffer 34. The use of a circular buffer with write and read pointers is well known in itself and accordingly need not be further described here.

It can be appreciated from the above description and the illustration of the advanced estimated CIR in FIG. 9 that this not only avoids the problem of inaccurate training of the TDEQ due to wrap-around of the estimated CIR by unwrapping the estimated CIR relative to the frame alignment, but also advances the estimated CIR to an optimum position relative to the frame alignment for minimizing the computation requirements for training the TDEQ. In other words, whereas in the prior art the estimated CIR used to train the TDEQ as described above can have the relative alignment shown in any of FIGS. 6 to 8 so that the entire estimated CIR, including leading zero parts as shown in FIGS. 6 and 7, must be processed, in accordance with this invention as described above the alignment of the estimated CIR used to train the TDEQ is always as shown in FIG. 9, with leading zero parts removed so that only significant parts of the estimated CIR with a predetermined alignment need to be processed. In addition, the retarding of the frame alignment by D+$\Delta$ samples by provision of the circular buffer 34 and adjustment of its read pointer as described above provides a direct adjustment to maintain the correct frame alignment on introduction of the TDEQ 32 into the communications path after it has been trained, thereby avoiding any need for a new search for the correct frame alignment.

Although not specifically recited throughout the above description, it will be appreciated that the control processor 44 of the receiver 12 implements the processes described above and controls the other parts of the receiver 12 accordingly. The control processor 44 and other parts of the receiver 12 may be implemented in combination as functions of one or more digital signal processor or application-specific integrated circuits, as is known in the art. In addition, it is observed that functions of the circular buffer 34 and of the S-P converter 36 may be combined.

Thus although a particular embodiment of the invention has been described in detail, it should be appreciated that the alternatives specifically mentioned above and numerous other modifications, variations, and adaptations may be made without departing from the scope of the invention as defined in the claims.

What is claimed is:

1. A method of operating a receiver of a system which communicates multicarrier modulation (MCM) symbols via a communications channel, comprising the steps of:

in an initialization process:

estimating a channel impulse response (CIR) of the channel using a predetermined periodic signal received via the channel;

circularly advancing the estimated CIR relative to a frame alignment of the MCM symbols to eliminate wrap-around of the estimated CIR relative to the frame alignment; and determining parameters for time domain equalization, of MCM symbols received via the channel, using the advanced estimated CIR;

and, in subsequent communications of MCM symbols via the channel:

equalizing received MCM symbols in accordance with the determined time domain equalization parameters; and retarding a frame alignment for the equalized received MCM symbols to compensate for the advance of the estimated CIR in the initialization process.

2. A method as claimed in claim 1 wherein the step of circularly advancing the estimated CIR relative to a frame alignment of the MCM symbols comprises circularly advancing the estimated CIR to remove leading substantially zero parts of the estimated CIR.

3. A method as claimed in claim 1 wherein the step of circularly advancing the estimated CIR relative to a frame alignment of the MCM symbols comprises determining a first position relative to the frame alignment of a maximum energy part of the estimated CIR, determining a second position in advance of the first position at which an energy of the estimated CIR is below a threshold, and circularly advancing the estimated CIR by an amount to move the second position to a frame alignment boundary.

4. A method as claimed in claim 3 and further comprising the steps of determining an energy of the maximum energy part of the estimated CIR, and determining the threshold in dependence upon the determined energy of the maximum energy part of the estimated CIR.

5. A method as claimed in claim 4 wherein the threshold is a predetermined fraction of the determined energy of the maximum energy part of the estimated CIR.

6. A method as claimed in claim 3 wherein the estimated CIR is circularly advanced by an amount D to move the second position to the frame alignment boundary, and the step of retarding the frame alignment for the equalized received MCM symbols retards the frame alignment by an amount D+Δ, where Δ is a time domain equalization delay.

7. A method as claimed in claim 6 wherein the time domain equalization is performed by a time domain equalizer having an integer number of M taps for samples of the received MCM symbols, and Δ is approximately equal to M/2.

8. A method as claimed in claim 6 and including the step of storing time domain equalized samples of the received MCM symbols in a circular buffer having a capacity for samples of at least two MCM symbols, wherein the step of retarding the frame alignment for the equalized received MCM symbols comprises adjusting a read pointer for reading samples from the circular buffer.

9. A method as claimed in claim 3 and including the step of storing time domain equalized samples of the received MCM symbols in a circular buffer having a capacity for samples of at least two MCM symbols, wherein the step of retarding the frame alignment for the equalized received MCM symbols comprises adjusting a read pointer for reading samples from the circular buffer.

10. A method as claimed in claim 2 and including the step of storing time domain equalized samples of the received MCM symbols in a circular buffer having a capacity for samples of at least two MCM symbols, wherein the step of retarding the frame alignment for the equalized received MCM symbols comprises adjusting a read pointer for reading samples from the circular buffer.

11. A method as claimed in claim 1 and including the step of storing time domain equalized samples of the received MCM symbols in a circular buffer having a capacity for samples of at least two MCM symbols, wherein the step of retarding the frame alignment for the equalized received MCM symbols comprises adjusting a read pointer for reading samples from the circular buffer.

12. A method as claimed in claim 1 wherein the MCM symbols comprise discrete multitone (DMT) symbols.

13. A method of operating a receiver of a discrete multitone (DMT) communications system, the receiver including a time domain equalizer for processing samples of DMT symbols communicated via a communications channel, comprising the steps of:

in an initialization process:

estimating a channel impulse response (CIR) of the channel using a predetermined periodic signal received via the channel;

circularly advancing the estimated CIR relative to a frame alignment of the DMT symbols to eliminate wrap-around of the estimated CIR relative to the frame alignment and to remove leading substantially zero parts of the estimated CIR; and determining parameters for the time domain equalizer from the advanced estimated CIR;

and, in subsequent communications of DMT symbols via the channel:

processing samples of received DMT symbols in the time domain equalizer in accordance with the determined parameters; and buffering the equalized samples of the received DMT symbols to compensate, in a frame alignment of the received DMT symbols, for the advance of the estimated CIR in the initialization process.

14. A method as claimed in claim 13 wherein the buffering of the equalized samples of the received DMT symbols also compensates, in the frame alignment for the received DMT symbols, for a delay of the time domain equalizer.

15. A receiver for a communications system using multicarrier modulation (MCM), the receiver comprising:

a time domain equalizer for processing samples of MCM symbols, received via a communications channel, in accordance with time domain equalization parameters:

a circular buffer for buffering time domain equalized samples output from the time domain equalizer; and a control processor coupled to the time domain equalizer and to the circular buffer, the control processor being arranged to estimate a channel impulse response (CIR) of the channel using a predetermined periodic signal received via the channel in an initialization process of the system, to circularly advance the estimated CIR relative to a frame alignment of the MCM symbols to eliminate wrap-around of the estimated CIR relative to the frame alignment, and to determine said time domain equalization parameters using the advanced estimated CIR;

the control processor further being arranged for controlling the time domain equalizer to equalize MCM symbols, received in subsequent communications of MCM symbols via the channel, in accordance with said time domain equalization parameters, and for controlling the circular buffer to retard a frame alignment for the time domain equalized MCM symbols to compensate for the advance of the estimated CIR in the initialization process.

16. A receiver as claimed in claim 15 wherein the circular buffer has a capacity for samples of at least two MCM symbols.

* * * * *